(12) United States Patent
Peng et al.

(10) Patent No.: US 8,678,862 B2
(45) Date of Patent: Mar. 25, 2014

(54) HOMEPLUG HAVING PANEL REPLACEMENT STRUCTURE

(75) Inventors: Jing-Yi Peng, New Taipei (TW); Shih-Po Lo, New Taipei (TW)

(73) Assignee: Askey Computer Corp. (TW)

( * ) Notice: Subject to any disclaimer, the term of this patent is extended or adjusted under 35 U.S.C. 154(b) by 24 days.

(21) Appl. No.: 13/611,060

(22) Filed: Sep. 12, 2012

(65) Prior Publication Data

US 2013/0330961 A1   Dec. 12, 2013

(30) Foreign Application Priority Data

Jun. 7, 2012   (TW) .............................. 101120474 A

(51) Int. Cl.
*H01R 27/02*   (2006.01)
(52) U.S. Cl.
USPC ............................ 439/638; 439/485; 439/676
(58) Field of Classification Search
USPC ........................ 439/76.1, 76.2, 485, 638, 676
See application file for complete search history.

(56) References Cited

U.S. PATENT DOCUMENTS

| | | | | |
|---|---|---|---|---|
| 5,545,046 | A * | 8/1996 | Masuda et al. ................ | 439/142 |
| 6,626,703 | B2 * | 9/2003 | Hsin .............................. | 439/638 |
| 7,494,383 | B2 * | 2/2009 | Cohen et al. .................. | 439/638 |
| 7,901,250 | B2 * | 3/2011 | Lam et al. ..................... | 439/638 |
| 8,517,771 | B2 * | 8/2013 | Kan et al. ...................... | 439/638 |

\* cited by examiner

*Primary Examiner* — Khiem Nguyen
(74) *Attorney, Agent, or Firm* — Schmeiser, Olsen & Watts, LLP

(57) ABSTRACT

A HomePlug having a panel replacement structure includes a HomePlug body and a panel. The HomePlug body has an operation side and a network port. The operation side has an insertion portion and a first coupling portion. The panel has an opening and second coupling portion. The second coupling portion can be coupled to the first coupling portion so as to allow the opening to correspond in position to the insertion portion. Changes in the appearance of the HomePlug are brought about by panel replacement. A heat dissipation vent is disposed at the junction of the operation side and an adjacent side, such that heat dissipation takes place at the adjacent side-neighboring portion of the heat dissipation vent when the panel is coupled to the operation side and covers the operation side.

7 Claims, 5 Drawing Sheets

HOMEPLUG HAVING PANEL REPLACEMENT STRUCTURE

CROSS-REFERENCE TO RELATED APPLICATION

This non-provisional application claims priority under 35 U.S.C. §119(a) on Patent Application No(s). 101120474 filed in Taiwan, R.O.C. on Jun. 7, 2012, the entire contents of which are hereby incorporated by reference.

FIELD OF TECHNOLOGY

The present invention relates to HomePlugs, and more particularly, to a HomePlug capable of bringing about variations by replacing a variety of panels.

BACKGROUND

HomePlug is a device based on Power Line Communication (PLC) and adapted to perform Internet surfing and data transmission. HomePlug works in conjunction with a data communication network built from an existing power line framework present in an indoor environment, such as a home, an office, a hospital. Hence, Unlike VDSL/ADSL, Power Line Communication (PLC) does not require constructing an additional circuit network for building a new communication network; instead, Power Line Communication (PLC) allows a user to install a HomePlug directly on an indoor alternating current (AC) electric outlet, such that an electronic device, such as a computer or a cell phone, can be electrically connected to the HomePlug for carrying out data transmission, and enables communication between the devices thus connected, thereby providing a local area network-based communication framework and allowing the devices to share accessible resources.

In general, a HomePlug comprises a casing and a circuit board received in the casing, wherein the circuit board has a plug and a socket. The casing of a conventional HomePlug comprises an upper case and a lower case. The upper and lower cases are integrally formed as a unitary structure by means of a die. To change the design of the appearance of the conventional HomePlug, it is necessary to carry out the die design of the upper and lower cases anew and launch the mass production thereof once again. Hence, from a manufacturer's perspective, mold opening and mass production have to be carried out anew to meet the appearance-related expectations of different end users, thereby resulting in an intricate lengthy design process and incurring a high cost. From an individual user's perspective, a conventional HomePlug typically features a monotonous invariable appearance.

Furthermore, to enable the circuit board and electronic components mounted thereon to undergo heat dissipation, a plurality of heat-dissipating vents is formed on the casing of a conventional HomePlug. After giving considerations to the beauty of the conventional HomePlug, HomePlug designers usually have the heat-dissipating vents formed on the lateral sides, rather than the front, of the casing of the conventional HomePlug. However, the heat dissipation performance of the conventional HomePlug is restricted by the quantity of the heat-dissipating vents and the area of coverage by the heat-dissipating vents, thereby compromising the performance of the conventional HomePlug.

SUMMARY

It is an objective of the present invention to provide a HomePlug having a panel replacement structure and being capable of bringing about variations by means of different replaceable panels.

Another objective of the present invention is to provide a HomePlug having a panel replacement structure, wherein a heat dissipation vent disposed on the front of the HomePlug can be hidden by a panel due to the position of the heat dissipation vent.

In order to achieve the above and other objectives, the present invention provides a HomePlug having a panel replacement structure. The HomePlug comprises a HomePlug body and a panel. The HomePlug body has a network port and an operation side. An insertion portion and a first coupling portion are disposed on the operation side. The panel has an opening and a second coupling portion. The second coupling portion is coupled to the first coupling portion, such that the operation side is coupled to and covered with the panel, and the opening corresponds in position to the insertion portion.

As regards the aforesaid HomePlug, the HomePlug body further has a heat dissipation vent disposed at the junction of the operation side and an adjacent side, and the panel covers an operation side-neighboring portion of the heat dissipation vent.

As regards the aforesaid HomePlug, area of the panel equals area of the operation side.

As regards the aforesaid HomePlug, the first coupling portion and the second coupling portion are an alignment hole and an engagement hook, respectively, so as to be corresponding in position to and coupled to each other in a separable manner.

As regards the aforesaid HomePlug, the first coupling portion and the second coupling portion are screw holes corresponding in position to and coupled to each other by screws.

As regards the aforesaid HomePlug, the first coupling portion and the second coupling portion are a jointing hole and a heat stake, respectively, so as to be corresponding in position to and coupled to each other by heating and melting.

As regards the aforesaid HomePlug, the HomePlug body further comprises a first casing and a second casing corresponding in position to and coupled to the first casing.

Accordingly, in an embodiment of the present invention, due to its panel replacement structure, a HomePlug can have its appearance changed without undergoing a design process and a mold opening process anew, but in a manner that facilitates product design and meets the requirement of product diversity. In another embodiment of the present invention, a HomePlug is configured to have a heat dissipation vent disposed at the junction of two sides of a HomePlug body and corresponding in position to the periphery of a panel, thereby hiding the heat dissipation vent disposed on the front of the HomePlug.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION

Figure 1A:
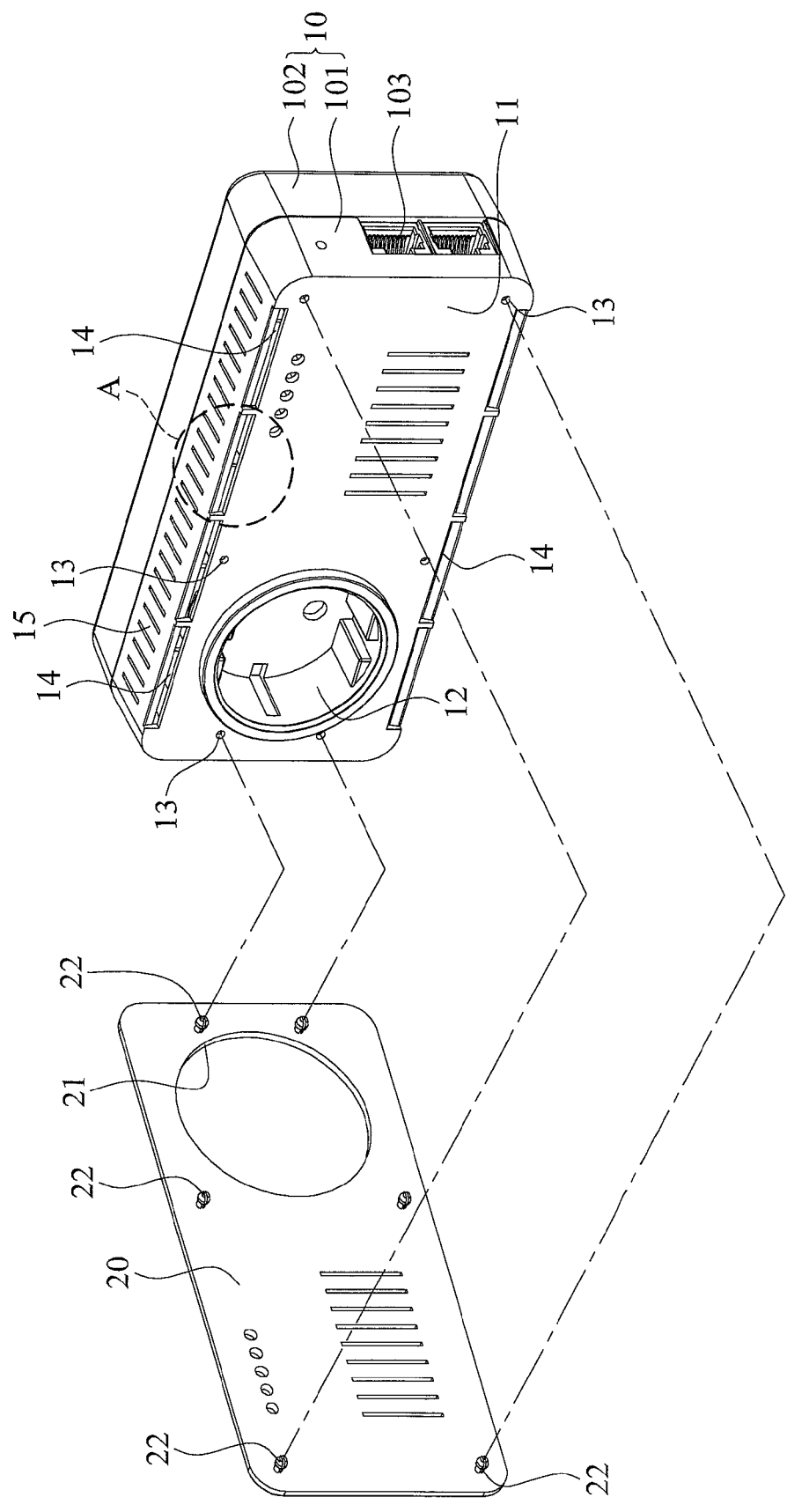
FIG. 1A is a schematic exploded view of a HomePlug body and a panel according to an embodiment of the present invention.
Figure 1B:
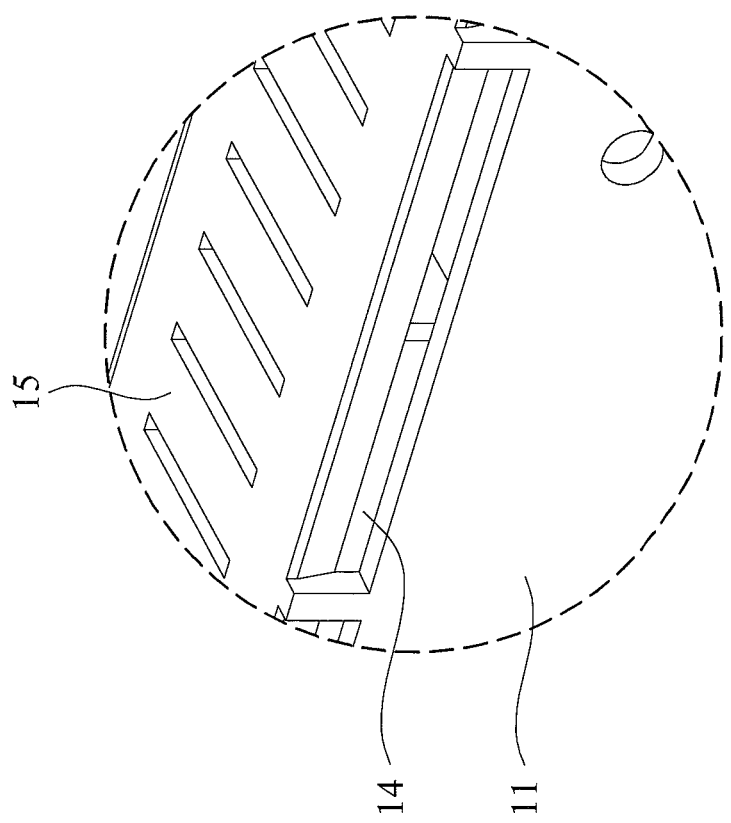
FIG. 1B is an enlarged view of portion A of the HomePlug in FIG. 1A.
Figure 2A:
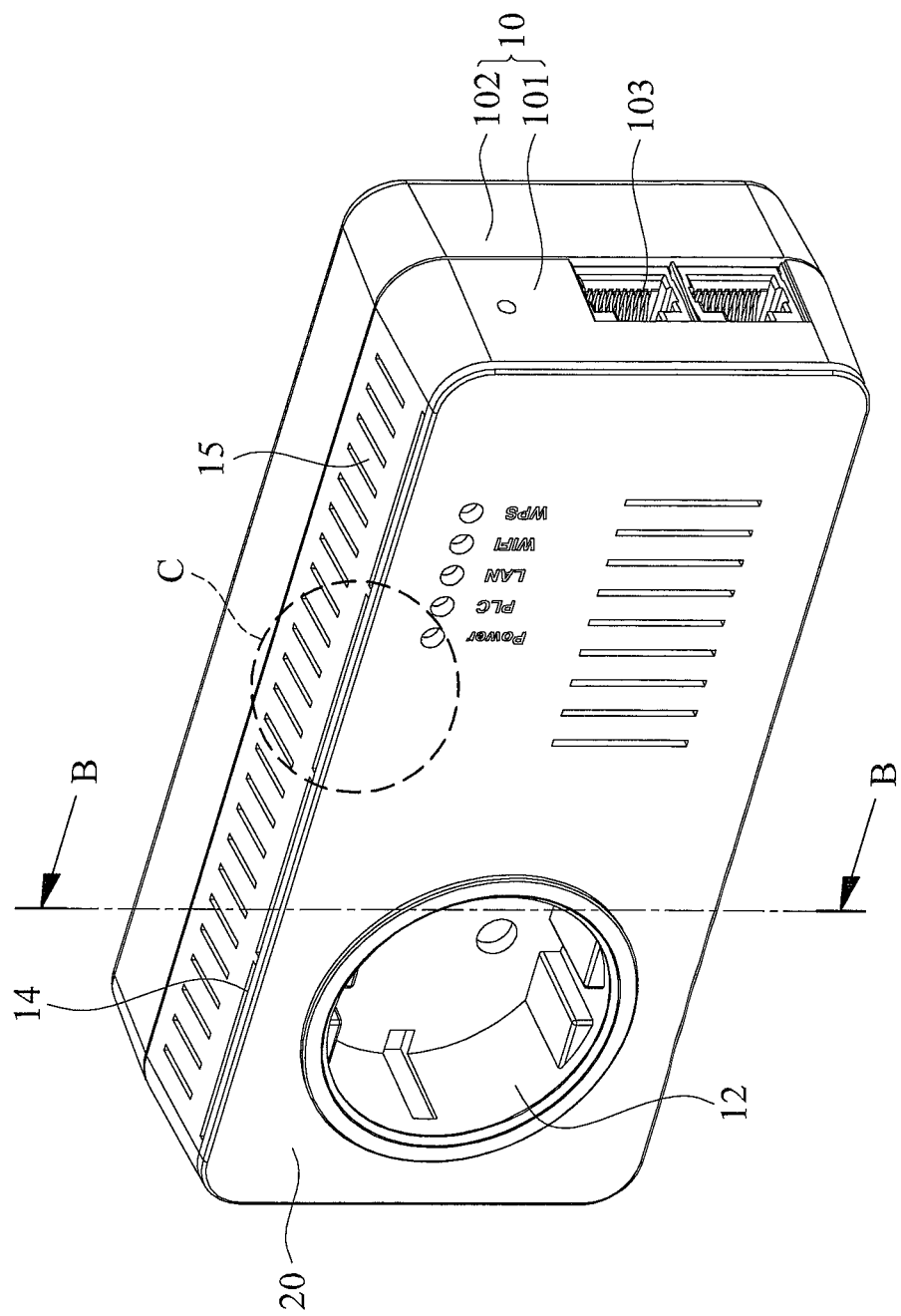
FIG. 2A is a schematic view of the HomePlug having a panel replacement structure according to an embodiment of the present invention.
Figure 2B:
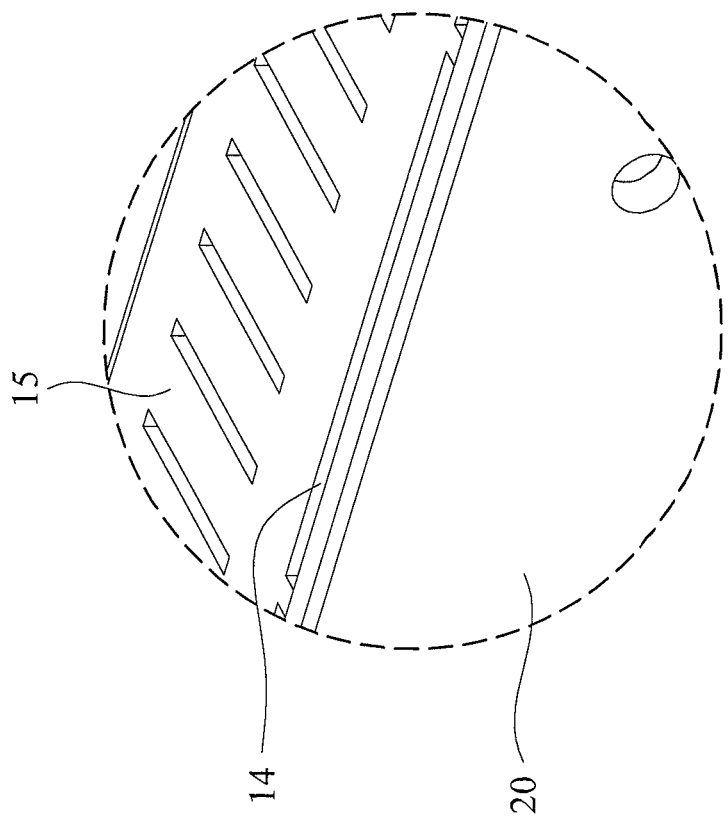
FIG. 2B is an enlarged view of portion C of the HomePlug in FIG. 2A.
Figure 3:
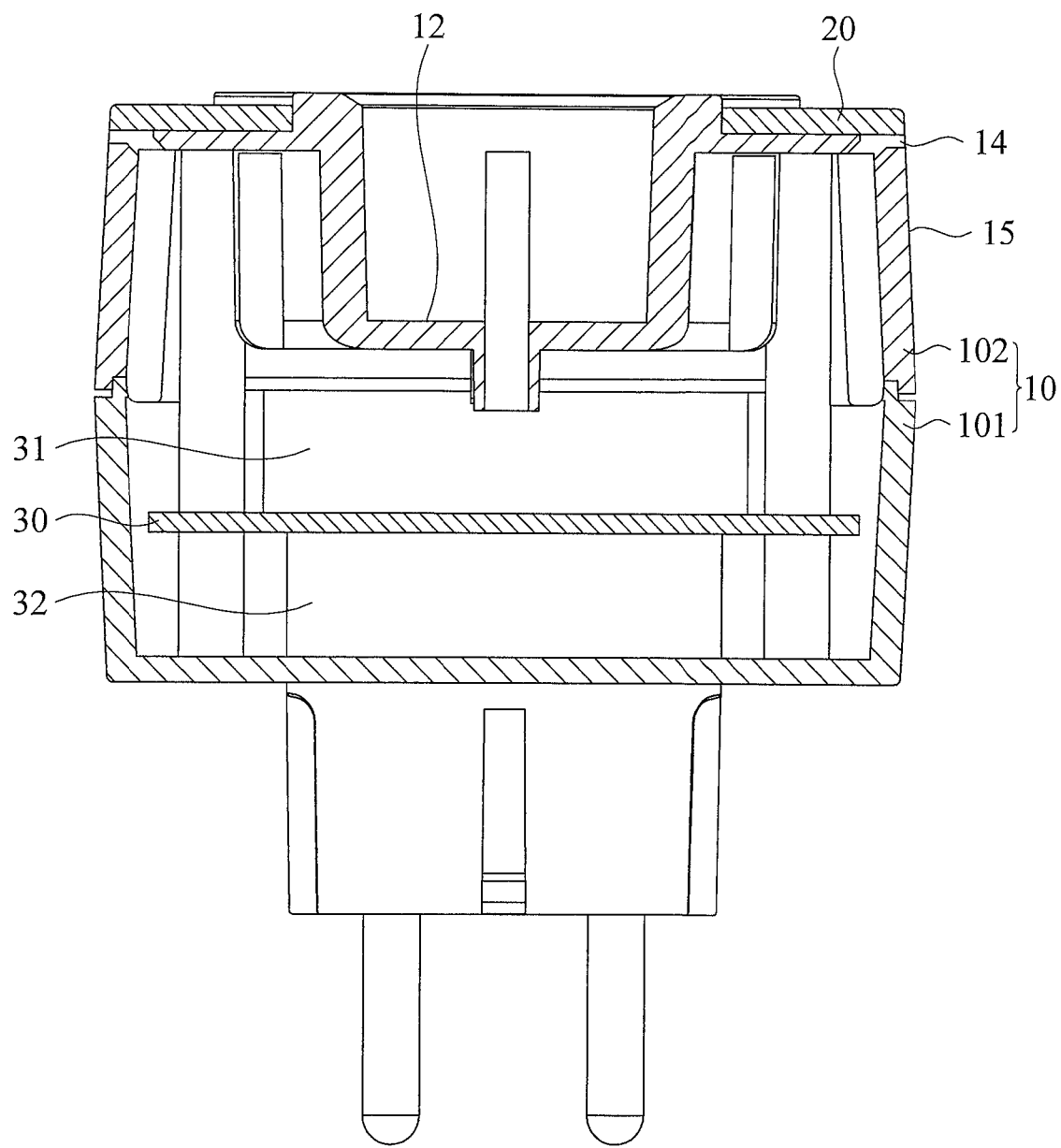
FIG. 3 is a cross-sectional view of a first casing and a second casing of the HomePlug taken along line B-B of FIG. 2A.

Referring to FIG. 1A, FIG. 1B, FIG. 2A, FIG. 2B, and FIG. 3, there are shown diagrams of a HomePlug of the present invention. FIG. 1A is a schematic exploded view of a HomePlug body and a panel according to an embodiment of the present invention. FIG. 1B is an enlarged view of portion A of the HomePlug in FIG. 1A. FIG. 2A is a schematic view of the HomePlug having a panel replacement structure according to an embodiment of the present invention. FIG. 2B is an enlarged view of portion C of the HomePlug in FIG. 2A. FIG. 3 is a cross-sectional view of a first casing and a second casing of the HomePlug taken along line B-B of FIG. 2A.

In an embodiment of the present invention, a HomePlug 1 comprises a HomePlug body 10 and a panel 20. The HomePlug body 10 has a network port 103 and an operation side 11. An insertion portion 12 and a first coupling portion 13 are disposed on the operation side 11. The panel 20 has an opening 21 and a second coupling portion 22. The second coupling portion 22 is coupled to the first coupling portion 13, such that the operation side 11 is coupled to and covered with the panel 20, and the opening 21 corresponds in position to the insertion portion 12.

In this embodiment, the first coupling portion 13 and the second coupling portion 22 are provided in the form of an alignment hole and an engagement hook, respectively, such that the first coupling portion 13 and the second coupling portion 22 together enable the HomePlug body 10 and the panel 20 to be corresponding in position to and coupled to each other in a separable or removable manner. Hence, in this embodiment, the replacement of the panel 20 enables variation of the appearance of the panel 20 and enhances component compatibility.

Furthermore, this embodiment and the accompanying drawings are illustrative rather than restrictive of the way of coupling the first coupling portion 13 and the second coupling portion 22 together. The first coupling portion 13 and the second coupling portion 22 are provided in the form of threaded screw holes, and are adapted to be corresponding in position to and coupled to each other by means of screws. Preferably, the screw holes of the second coupling portion 22 do not penetrate the panel 20. For example, the depth of the screw holes of the second coupling portion 22 is a half of the thickness of the panel 20. The screws are penetratingly disposed in the HomePlug body 10 to couple the first coupling portion 13 and the second coupling portion 22 together. Hence, after the panel 20 has been coupled to the HomePlug body 10, the screws and the second coupling portion 22 are invisible from outside the HomePlug 1.

In another embodiment of the present invention, the first coupling portion 13 and the second coupling portion 22 are provided in the form of a jointing hole and a heat stake, respectively, such that the first coupling portion 13 and the second coupling portion 22 can be corresponding in position to and coupled to each other by heating and melting. In doing so, it is feasible to change the panel 20 and thereby alter the appearance of the HomePlug 1, so as to facilitate product design. In addition, the HomePlug body 10, coupled with the variation of the panel 20, enables variation of product appearance, enhances component compatibility, dispenses with a mold opening process, and cuts production costs.

In this embodiment, the HomePlug body 10 further has a heat dissipation vent 14 disposed at the junction of the operation side 11 and an adjacent side 15 of the HomePlug body 10. The panel 20 covers an operation side-neighboring portion of the heat dissipation vent 14. Referring to FIG. 2, in this embodiment, the HomePlug body 10 is of a rectangular box-like shape. The operation side 11 is the front of the HomePlug body 10. The adjacent side 15 adjoins the operation side 11 and is a lateral side of the HomePlug body 10. The heat dissipation vent 14 is formed at the junction of two sides of the HomePlug body 10. The area of the panel 20 equals the area of the operation side 11. Hence, after the panel 20 has been coupled to the HomePlug body 10, the panel 20 covers an operation side-neighboring portion of the heat dissipation vent 14, as shown in FIG. 2A, FIG. 2B, and FIG. 3. Therefore, the panel 20 hides the heat dissipation vent 14 exposed from the front of the HomePlug body 10. In addition, the HomePlug body 10 further comprises a first casing 101 and a second casing 102 corresponding in position to and coupled to the first casing 101. Therefore, the HomePlug body 10 comprises the first casing 101 and the second casing 102. The first casing 101 and the second casing 102 are coupled together by means of ultrasonic melting fusion, engagement, snap-engagement, etc.

In an embodiment of the present invention, the HomePlug 1 further comprises a circuit board 30, a socket 31, and a plug assembly 32 which are received in the HomePlug body 10. The socket 31 and the plug assembly 32 are disposed on two opposite sides of the circuit board 30, respectively. The socket 31 is connected to the HomePlug body 10. The insertion portion 12 is adapted for insertion by an external plug. A circuit related to functional expansion and electrically connected to a power line network is disposed on the circuit board 30, so as to allow a user to plug the HomePlug 1 into an indoor alternating current (AC) electric outlet, such that data transmission can be carried out in the power line network by means of the HomePlug 1.

Therefore, in an embodiment of the present invention, due to its panel replacement structure, a HomePlug can have its appearance changed without undergoing a design process and a mold opening process anew, but in a manner that facilitates product design and meets the requirement of product diversity. In another embodiment of the present invention, a HomePlug is configured to have a heat dissipation vent disposed at the junction of two sides of a HomePlug body and corresponding in position to the periphery of a panel, thereby hiding the heat dissipation vent disposed on the front of the HomePlug.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A HomePlug having a panel replacement structure, the HomePlug comprising:
   a HomePlug body having a network port and an operation side, wherein an insertion portion and a first coupling portion are disposed on the operation side; and
   a panel having an opening and a second coupling portion, the second coupling portion being coupled to the first coupling portion, so as for the operation side to be coupled to and covered with the panel, allowing the opening to correspond in position to the insertion portion.

2. The HomePlug of claim 1, wherein the HomePlug body further has a heat dissipation vent disposed at a junction of the operation side and an adjacent side, and the panel covers an operation side-neighboring portion of the heat dissipation vent.

3. The HomePlug of claim 1, wherein area of the panel equals area of the operation side.

4. The HomePlug of claim 1, wherein the first coupling portion and the second coupling portion are an alignment hole and an engagement hook, respectively, so as to be corresponding in position to and coupled to each other in a separable manner.

5. The HomePlug of claim 1, wherein the first coupling portion and the second coupling portion are screw holes corresponding in position to and coupled to each other by screws.

6. The HomePlug of claim 1, wherein the first coupling portion and the second coupling portion are a jointing hole and a heat stake, respectively, so as to be corresponding in position to and coupled to each other by heating and melting.

7. The HomePlug of claim 1, wherein the HomePlug body further comprises a first casing and a second casing corresponding in position to and coupled to the first casing.

\* \* \* \* \*